INVENTOR:
MOMIR BABUNOVIC
BY Gravely, Lieder & Woodruff
ATTORNEYS.

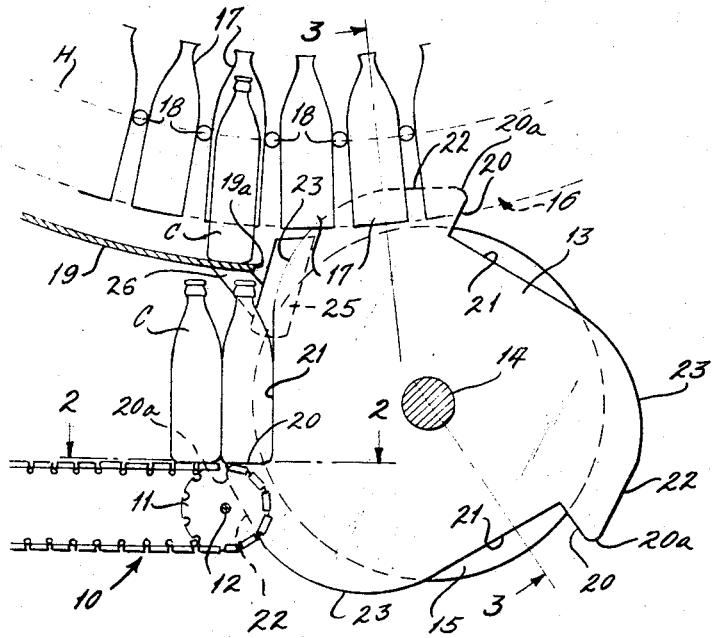

United States Patent Office 3,420,353
Patented Jan. 7, 1969

3,420,353
CONTAINER TRANSFER APPARATUS
Momir Babunovic, Ballwin, Mo., assignor to Barry-Wehmiller Company, St. Louis, Mo., a corporation of Missouri
Filed Jan. 16, 1967, Ser. No. 609,420
U.S. Cl. 198—22          3 Claims
Int. Cl. B65g 47/00

ABSTRACT OF THE DISCLOSURE

Apparatus for transferring containers in substantial normal upright position between a lower conveyor and an upper conveyor in which rotary transfer means is employed for lifting the containers into successive pockets of the upper conveyor and for stabilizing the lateral position of the containers during the lifting movement so that containers may be moved rapidly into the pockets of the upper conveyor without the risk of toppling.

---

This invention relates to container transfer apparatus in which a supply of containers is moved on a suitable conveyor to a station where the containers in normal standing position are gently but rapidly transferred without any substantial change in the standing position to a second conveyor moving in a direction different from the path of container movement during the transfer.

At the present time container transfer apparatus associated with washing or processing machinery operates generally to change the position or attitude of containers during the transfer act. This type of container handling cannot be done very fast, expecially with breakable containers, and in view of this there have existed limitations on the quantity of glass containers that can be handled without reaching a speed which would induce excessive breakage. It is typical of the current apparatus where the containers are brought up in normal standing positions to tip or lay the containers over on one side during the transfer movement. In the case of bottle washer and rinser machinery the prevailing mechanisms are limited to a maximum speed of 30 cycles per minute because of the need to turn or tip the bottles and because the components of the apparatus have to be of substantial construction which could cause impact breakage if bottles were handled any faster.

In the present apparatus it is an important object to avoid a great many of the objections of previous apparatus and in so doing to improve on the speed of handling bottles so that the maximum speed can be more than doubled to from 60 to 70 cycles per minute.

It is another important object to simplify the apparatus so that such components as guide troughs, auxiliary wipers, and reorientation means can be eliminated.

Other objects will be set forth in the following specification which will describe a preferred embodiment illustrated in the accompanying drawings, wherein:

FIG. 1 is a fragmentary, and somewhat schematic, elevational view, partly in section, of a preferred embodiment of the container transfer apparatus;

Fig. 2 is a fragmentary plan view taken at line 2—2 in Fig. 1;

FIGS. 4, 5 and 6 are schematic views illustrating the sequence of events in a typical operating cycle of the container transfer apparatus.

Figure 3:
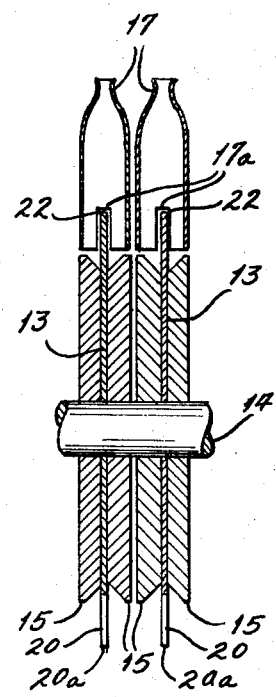
FIG. 3 is a fragmentary transverse sectional view taken at line 3—3 in Fig. 1.

Attention will be directed to Figs. 1, 2 and 3 wherein there is illustrated a first conveyor 10 which may consist of table top links pivotally connected so as to easily pass around a pulley 11 operatively mounted on a shaft 12.

The conveyor 10 is shown only in sufficient detail to illustrate how containers C are brought up to the discharge end of the conveyor which is substantially at the pulley 11. In FIG. 2 it can be seen that the conveyor 10 is preferably made up of a series of parallel table top chains 10a spaced apart so as to permit the passage therebetween of cam plates 13. The cam plates are spaced apart along shaft 14 so that there is intervening room to mount suitable container cradling members 15. As seen in Figs. 2 and 3, the cam plates have a pair of cradling members 15 positioned adjacent opposite faces thereof so that the assembly of a plurality thereof will be sufficient for the handling of a plurality of containers being supplied upon a plurality of table top conveying chains 10a.

Each cam plate 13 and its cooperating container cradling members 15 operatively mounted for rotation with shaft 14 constitutes a transfer apparatus for moving containers C from the first conveyor 10 to a second conveyor 16 which is located above conveyor 10. The second conveyor 16 consists in a plurality of pockets 17 articulated by suitable hinges 18 so that the conveyor 16 will follow a circular or non-linear path defined by the dotted line H. A suitable conveyor 16 is shown in Babunovic et al application Serial No. 463,159, filed June 11, 1965, now Patent No. 3,305,065. The conveyor 16 is moved by suitable sprocket drive mechanism (not shown) such that the series of pockets 17 (there may be as many pockets width-wise of the apparatus as there are container table top chains 10a) are carried past the transfer apparatus and over a fixed guide 19 which will prevent the containers C, once they have been lodged in the respective pockets 17, from dropping out upon leaving the location of the transfer apparatus.

Still with reference to FIG. 1, it can be seen that the transfer apparatus consists of the container cradling members 15 which are circular and the intervening cam plate 13. Each cam plate 13 is provided with a plurality of circumferentially spaced lifting steps 20, adjacent step shoulders 21, and container retarding shoulders 22. Beyond each container retarding shoulder 22 the cam plate is provided with a curved surface 23 that is smoothly formed to merge the retarding shoulder 22 into the step shoulder 21. It is also seen in FIG. 1 that the container lifting steps 20 project beyond the circumferential limits of the cradling members 15, as do the retarding shoulders 22 and the curved surfaces 23. However, the step shoulders 21 do not extend beyond the circumference of the cradling members 15 but are, on the contrary, recessed so that the beveled faces 15a on the cooperating container cradling members will be jointly exposed to provide a trough which will effectively cradle each container brought thereto by the conveyor 10. In this manner the containers are effectively prevented from rolling laterally out of position. As shown in the various views of the drawing the lifting steps 20 are of sufficient radial depth to securely engage the bottom surfaces of the containers, and still not project radially far enough to cause interference with the following containers which are next in position to be transferred.

Figure 5:
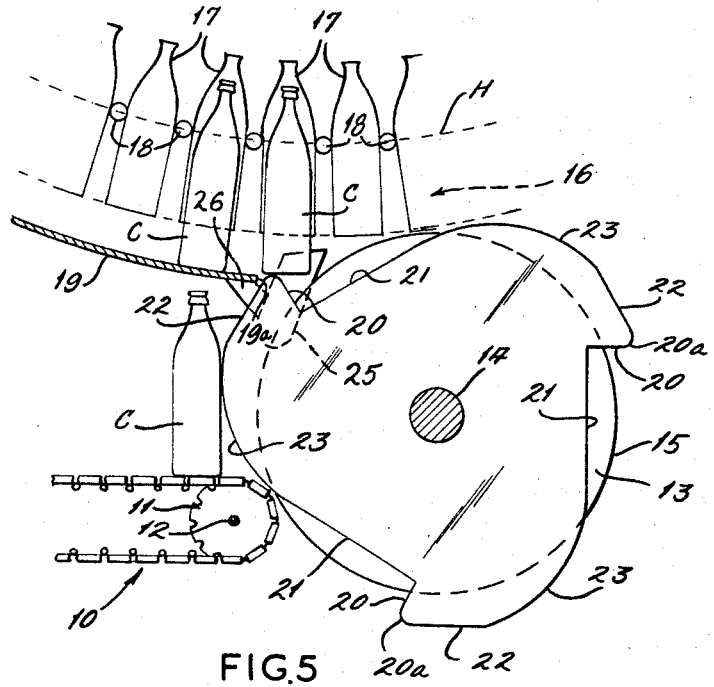
Figure 6:
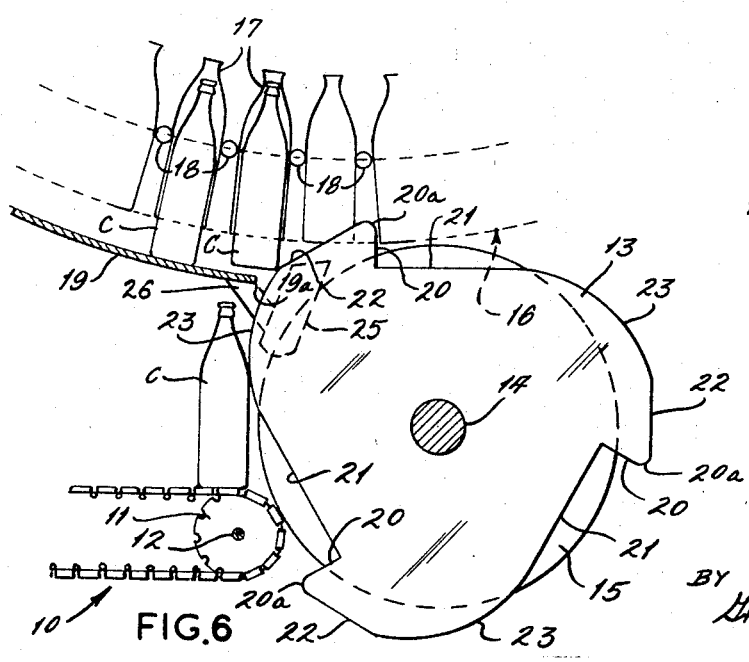

As is observed in FIGS. 4, 5 and 6, the initial operation of the transfer apparatus is to receive each container C on one of the lifting steps 20 and to elevate the container, without substantial change in the normal standing position thereof, directly into the receiving pockets 17 of the second conveyor 16. As is shown in FIG. 4, the container being lifted by step 20 has its mouth or filling end almost immediately projected into the open bottom of the pocket 17, the shoulder and body of the container clearing the edge 19a of the fixed guide 19. There is a sufficient gap established between the container and edge 19a so that the container, upon engaging the trailing side of the pocket 17, can immediately be caused to straighten up as the mouth slides along the inside surface of the pocket.

As observed in FIG. 4, each pocket 17 is provided with diametrally aligned slots 17a which lie in the plane of the cam plate 13 so that the various portions of the cam plate 13 projecting beyond the circumference of the cradling members 15 will pass through the slots 17a with just enough clearance to avoid obstruction. On the other hand the slots 17a can not be excessively wide, otherwise it will be possible for the filling end of the containers C to experience some interference when being forced to slide over the slots 17a.

In the sequence of container transfer as shown in FIGS. 4, 5 and 6, it is noted that in FIG. 4 once the leading container C is on the lifting step 20 and has been elevated a short distance, the container retarding portion 22 of the cam plate 13 effectively holds back the supply of containers. As shown in FIG. 4, the container retarding shoulder 22 is defined by a substantially flat section on the edge of the cam plate 13, and this flat section is immediately followed by the curved section 23 whose function is to continue to retard the following containers until the cam plate has rotated first to a position as shown in FIG. 5 where the tip 20a of the lifting step 20 is effective to raise the bottom of the container to a point where it will pass smoothly over the edge 19a of the fixed guide 19 and thereby become firmly captured in the pocket 17 of the second conveyor. At this point the second conveyor 17 must remove the container C sufficiently rapidly so that there will not be excessive continued lifting of the container in the pocket 17 such as lifting to a height where, on its drop-back, it will experience a sufficient impact on the guide 19 to cause fracture.

As observed in FIG. 6, the container drop-back is effectively retarded by the side of the pocket 17 and container retarding shoulder 22. When the straight portion of the retarding shoulder 22 has run off over the bottom of the container C the smoothly curved section 23 then becomes effective with the side of pocket 17 to permit a controlled drop-back of the containers onto the surface of the guide 19. Simultaneously with the control of the transfer of the container into the pockets 17 it is observed in FIG. 6 that the smoothly curved surface 23 is also effective to control feed-in of the containers on conveyor 10 whereby there is no abrupt impact of the container on the lifting step 20 due to the pressure of following containers. In this connection the relatively straight edge of the step shoulder 21 will function to bring the next container to be transferred into proper attitude for engagement by the lifting step 20.

While the foregoing description has discussed the function of the apparatus in relation to a single container, it is understood that the transfer apparatus can be multiplied along the length of the drive shaft 14 to take care of any number of containers in a simultaneous manner. Frequently apparatus for processing containers such as washers, have a sufficient width to handle as many as 40 ranks of containers, and in the present transfer apparatus one rotation of the cam plates 13 will effect the transfer of three ranks of containers, thereby clearly increasing the speed of container transfer without developing adverse impact force or necessitating the rough handling of breakable containers.

It is, of course, understood that the motion of the transfer mechanism must be accurately timed with the movement of the second conveyor 16 so that the containers can register with the respective pockets 17 and pass through the gap at the edge 19a of the fixed guide 19 without running into the danger of being trapped against the edge 19a and being crushed. It is important in the present transfer apparatus that the cam plates 13 are formed with lifting and retarding sections for the proper control and handling of the containers. It is also important that the cam plates are sandwiched between container cradling members 15 so that the containers can not get out of proper vertical alignment during the period of transfer. Thus, there is provided a three surface support for the containers, two of the support surfaces being the beveled faces 15a of the cradling members and the third surface being the lifting step 20.

As indicated in the drawings the containers may be guided into the pockets 17 by guide means 25 supported by arms 26 from the fixed guide 19. The means 25 acts to steer the container into the pocket 17 and assists the cradling members 15.

There has been described above a preferred embodiment of the present container transfer apparatus which is capable of functioning without substantially changing the vertical or stand-up position of the containers and can handle a plurality of container transfer functions in each rotation thereby increasing the number of containers that can be transferred from one conveyor to another. There has also been set forth the particular shape and other characteristics of the transfer mechanism as constituted by cam plates and container cradling members.

What is claimed is:

1. Container transfer apparatus comprising first and second conveyor means arranged in vertical spaced positions and separated by at least the distance of a container length, container handling means operative to move containers from the lower conveyor means to the higher conveyor means, said handling means including a member rotating on a horizontal axis and formed with a plurality of circumferentially spaced container lifting surfaces sequentially accepting containers from the lower conveyor means and lifting the containers to the higher conveyor means, and axially spaced means adjacent to and movable with each lifting surface to cradle a container being lifted against lateral displacement from the lifting surface, said lifting surface having a path of movement which intercepts the path of the higher conveyor means, a container support means adjacent the path of said higher conveyor to receive the containers from said lifting surfaces and take over support of the containers at least adjacent the zone of interception of said container lifting surface with said higher conveyor.

2. The container transfer apparatus set forth in claim 1 wherein said second conveyor means includes a series of open bottom container receiving pockets, said support means has a run-on edge spaced from said rotating member to form a gap through which containers are lifted and said lifting surfaces push the containers into said pockets sufficiently to have the bottom of the containers above said support means so as to clear said run-on edge.

3. The container transfer apparatus set forth in claim 1 wherein said rotating member is formed with a container retarding surface adjacent each lifting surface, said retarding surface preventing containers following a container on said lifting surface from pressing thereon, and said retarding surface moving concurrently with the container being lifted and cooperating therewith to prevent container drop-back impact on said container support means.

References Cited

UNITED STATES PATENTS 2,854,125  9/1958  Johnson _____ 198—22 X

FOREIGN PATENTS 559,233  9/1932  Germany.
950,773  2/1964  Great Britain.

EDWARD A. SROKA, *Primary Examiner.*

U.S. Cl. X.R.

198—25